(No Model.) 2 Sheets—Sheet 1.

H. L. GEE.
TRUCK FOR MOTOR OR CABLE CARS.

No. 574,532. Patented Jan. 5, 1897.

Witnesses,
Charles Perkins
A. Selkirk Jr.

Horace L. Gee
by Alex. Selkirk
Attorney (No Model.) 2 Sheets—Sheet 2.

H. L. GEE.
TRUCK FOR MOTOR OR CABLE CARS.

No. 574,532. Patented Jan. 5, 1897.

Witnesses

Horace L. Gee,
Inventor.
by Alex. Selkirk
Attorney

THE NORRIS PETERS CO., PHOTO-LITHO., WASHINGTON, D. C.

UNITED STATES PATENT OFFICE.

HORACE L. GEE, OF KINGSTON, NEW YORK, ASSIGNOR TO THE DIAMOND TRUCK AND CAR GEAR COMPANY, OF NEW YORK, N. Y.

TRUCK FOR MOTOR OR CABLE CARS.

SPECIFICATION forming part of Letters Patent No. 574,532, dated January 5, 1897.

Application filed July 24, 1895. Serial No. 556,966. (No model.)

*To all whom it may concern:*

Be it known that I, HORACE L. GEE, a citizen of the United States, and a resident of Kingston, in the county of Ulster and State of New York, have invented certain new and useful Improvements in Trucks for Motor or Cable or other Cars, of which the following is a specification.

My invention relates to improvements in trucks for electric-motor cars, cable or other cars liable to be driven at times at a high rate of speed, or be variously loaded, or be run over railways of varying grades and curves; and it consists in the combinations of elements and devices hereinafter described, and set forth in the claims.

The primary objects of my invention are to provide the longitudinal side bolster-plates and the truck-frame with elastic guide and check bolts and springs which are calculated to prevent both a horizontal and lateral movement of said bolster-plates in relation to the truck; also, to provide between the truck and the upper and lower sides of the housings of the axle-journals elastic supports which are calculated to prevent the opposite ends of the truck and said bolster-plates from oscillating vertically; also, to so combine with the truck-frame side bolster-plates and the truck-wheel axles elastic guide-bolts which are adapted to preserve the several parts or members of the truck sustaining loads and resisting strains at about their normal relative positions, with suitable allowances for elastic movement of the non-elastic members and parts of the truck, so that the line of the plane of the horizontal side bolster-plates may at all times be preserved about parallel with the line of the upper surface of the rails on which the truck-wheels travel.

Other objects and advantages of this invention will appear in the following description, and the novel features thereof will be particularly pointed out in the claims.

I attain these objects by the means illustrated in the accompanying drawings, forming a part of this specification, in which—

Figure 1:
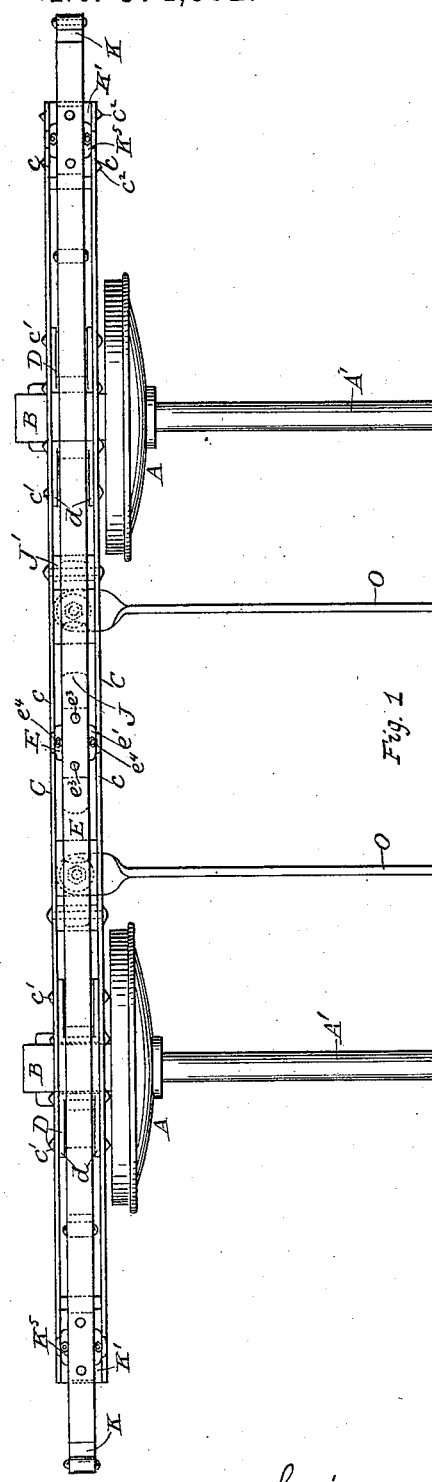
Figure 2:
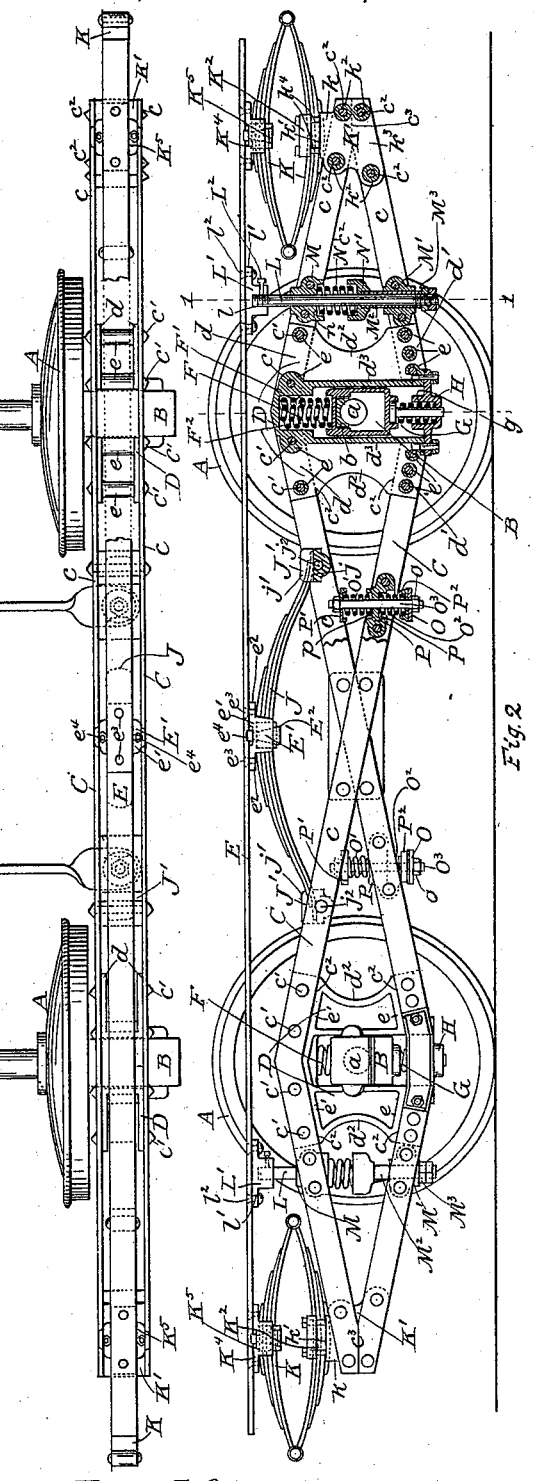
Figure 3:
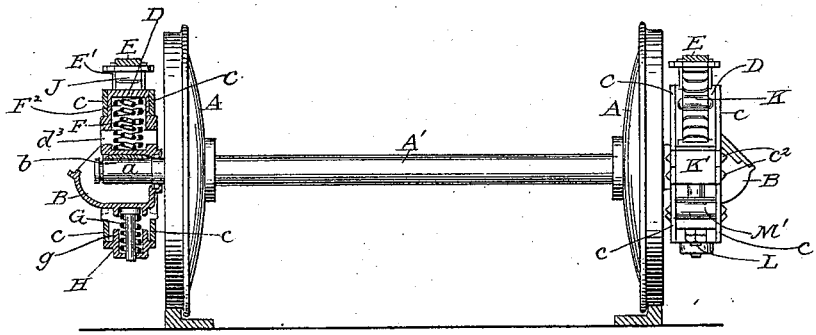
Figure 4:
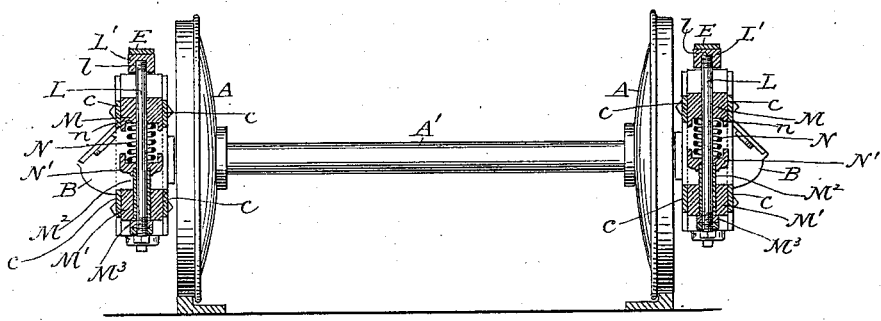

Figure 1 is a plan view of a truck, with parts broken away for exposing hidden parts, embodying the improvements in this invention. Fig. 2 is a side elevation, with parts in section, of the same. Fig. 3 is an end elevation of the truck and one of the pedestals, housing, and their adjuncts shown in section; and Fig. 4 is a transverse section at line No. 1 in Fig. 2.

The same letters of reference refer to similar parts throughout the several views.

In the drawings, A A are the wheels of the truck. A' A' are the axles of the same. $a\ a$ are the journals of said axles.

B B are the housings of the axle-journals, and $b\ b$ the bearing boxes or brasses between the journals and housings.

C C are the side frames of the trucks. D D are the pedestals between the members of said frames and the said housings, and E E are the longitudinal side bolster-plates.

The above-mentioned parts and elements are not my invention, yet I employ, in combination with them, other devices which I believe are new and are my invention and are calculated to distribute the weight and strains attending the truck while in service more uniformly over the said old parts than heretofore had in the old form of construction of trucks.

The side frames C C of the truck may be of any suitable form of construction, yet I preferably employ the "diamond-form" truck-frame illustrated in the drawings, that being what I at present consider a preferable form of construction for use in motor or cable cars by reason of its great strength and resistance to strains while in active service. Although the side frames at each side of the truck may comprise a single pair of connected diamond-form pedestal-holding sections composed of members secured by hot-riveted rivets to the flange portions of the pedestals, yet for service on roads having heavy grades, short curves, and running high speeds I prefer to employ dual diamond-form frames C C at each side of the truck, with the pedestals of the respective sides secured between the members of said dual frames by hot-riveted rivets $c'\ c'$.

In the truck-frame illustrated in the drawings the pedestals D D are provided with front and rear side flanges $d\ d$ above and similar flanges $d'\ d'$ below, which flanges are integral with the intermediate front and rear side webs $d^2\,d^2$ of the pedestals, and also with vertical side walls $d^3$, shown by full and dotted lines to be at the sides of the housings B, and between which walls $d^3\,d^3$ the housings are received. These front and rear side flanges $d\,d$ and $d'\,d'$ of the said pedestals are reinforced each by the other by means of the perforated tie-pieces $e\,e$, (shown by full lines and indicated by dotted lines in the drawings,) integral with said flanges $d\,d$ and $d'\,d'$. Integral with these flanges and side web portions of the pedestals are outwardly-projected reinforcing-ledges $e'\,e'$, against which the inner edges $c^2$ of the respective members of the frame abut when secured to the respective flanges of these pedestals.

F F are load-bearing springs between the respective pedestals D and housings B within. These springs I preferably form of elastic coiled steel, and they may be double, with one contained within the other, as shown. The lower end of this double coil-spring is seated in the recess $F'$ formed with the upper side wall of the housing B, while the upper end or half portions of the springs are received within the spring-chamber $F^2$ contained within the upper end portion of the pedestal, and of diameter corresponding with that of the springs for nicely receiving the same, yet allowing the springs to freely contract and expand, as may be necessary when the truck is in service.

G G are tension-springs interposed each between the lower side of a housing B and a spring-support H, suitably secured to the lower ends of the horns of the pedestal the housing is intended to work. This spring G is preferably of elastic coil form and has its upper end portion contained within the recessed seat $g$ formed in the lower side of the housing B, while its lower end portion is contained within the spring-receiving wall $g$ of the spring-support H. This spring-support H may be made with any suitable form which is calculated to adapt it to be rigidly secured to the lower ends of the horns of the pedestal and hold the spring G under tension and in place supporting the housing B and imposing tension on the load-supporting spring, seated on the upper side of the housing, to such a degree as to be calculated to hold the housing elastically suspended within the jaw-opening of the pedestal, so that when the truck is in service the vertical oscillation of its opposite ends will be wholly or nearly prevented. This tension-spring and tension-spring support together with other devices and elements employed in combination therewith are the subject-matters of my application, Serial No. 556,965, filed July 24, 1895, and are employed by me in this invention in combination with parts and devices in trucks which I preferably employ in the same.

J J are equalizing-springs arranged one at each side frame of the truck and interposed between the same and the longitudinal bolster-plates E at about the middle of the truck. These springs J have their opposite ends preferably supported from the bearing-blocks $J'\,J'$, secured between the parallel members $c\,c$ of the duplex side frame C. These blocks are shown to be provided on their upper sides with an extensive plain bearing-surface $j$, from which the end portions of spring J are supported without being secured thereto, and on which they may slide horizontally in either direction, accordingly as they lengthen or shorten, when the truck is in service and loaded. These blocks are provided with laterally-extended side flanges $j'\,j'$ for bearing on the upper edges of the members $c\,c$ of the frame, and they may be secured between said members by any suitable means, yet preferably by rivets $j^2$, hot-riveted. These equalizing-springs may each be secured to the bolster-plates E from their lower side by any suitable means, yet I preferably provide between said bolster-plates and springs spring-blocks $E'$, provided with side ledges or flanges $e'$ and end lugs $e^2$, by which they are secured with the respective bolster-plates by rivets $e^3$, hot-riveted. Clips $E^2$, straddling said springs, with their bolt members $e^4$ passing each through a side flange $e'$ of the block and secured by screw-threaded nuts, securely hold these equalizing-springs J with the bolster-plates.

K K are the end springs of the truck. These springs are preferably of the class known as "elliptic" steel springs and are located at the ends of the side frames of the truck and between said side frames and the bolster-plates E.

$K'\,K'$ are the frame-supporting spring-blocks, which comprise flange portion $k$ and spring-seat portion $k'$, integral with each other. Perforated sleeves $k^2$, (indicated by dotted lines and shown by full lines,) integral with the side web portions $k^3$ of said block, are received between the ends of members $c\,c$ of the frame and secured thereto by rivets $c^2\,c^2$, hot-riveted, after passing through the perforations of sleeves $k^2$ and rivet-holes provided in said members. If preferred, bolts may be substituted for the rivets, yet preference is given to the use of the latter when hot-riveted, because of the greater rigidity and security of the parts held in union. In the diamond form of arrangements of the ends of the frame members $c\,c$ at this block $K'$ I abut the adjacent edges $c^3\,c^3$ of the end portions of said members each against the other, with their sides flat against the web portions $k^3$ of the said block and the flange portions $k$ of the block abutting on the upper side edge of the upper frame member. The union of all the parts with block $K'$ is made strong to resist all strains which may be imposed on said block and connected members. With blocks $K'$ are employed tie-bolts $k^4$, passing upwardly through the spring-seat $k'$, and at the sides of the spring K, and then through the tie-piece $K^2$, and secured by screw-threaded nuts screwed tightly on said tie-piece and rigidly binding the lower half of the spring to its seat on the block. The upper half of each of these springs K is secured to its bolster-plate E by spring-blocks $K^4$ and clips $K^5$, similar to spring-block E and clip $E^2$, shown to be employed with the equalizing-spring J and bolster-plate for securing the same with each other. These elliptic springs K, being arranged relatively lengthwise with the bolster-plates and elastically supporting their end portions above the side frames, operate not only to elastically support the end portions of said bolster-plates, as do rubber or spiral springs, but they prevent those plates from moving horizontally under impulses attending sudden startings or stoppages of the car and also prevent an endwise racking movement of the bolster-plates when the car is ascending or descending grades.

L L are elastic guiding check-bolts, each preferably adjacent to a pedestal of the truck-frame and arranged between the side frame and bolster-plate above, as shown. A description of one of these elastic guiding check-bolts and its coacting adjuncts will suffice for the others. This bolt L is preferably of steel or stiff metal of diameter of one and one-half inches, more or less, as may be sufficient to insure stiffness for the service it is to perform in the truck, and it is of length sufficient to extend from the bolster-plates to a short distance below the lower side of the lower member or other member it is to hold with when secured in place for limiting the vertical movements of the bolster-plate in relation to the truck-frame below. The upper end of this check-bolt is secured to the bolster-plate E in an adjustable manner, although this adjustability of the bolt may not in all cases be necessary; yet to secure this adjustability of length of the bolt I at present prefer to employ the downwardly-projected holding-block L', provided with a screw-threaded perforation $l$, receiving the screw-threaded upper end of the bolt L, and having lugs $l'$ $l'$ integral with said block and receiving rivets $l^2$ $l^2$, which pass through the bolster-plate and are secured by hot-riveting. $L^2$ is a set-screw screwing in a screw-threaded perforation in said block and against the end of the bolt screwed therein for preventing the latter turning in the former.

M M' are guide-blocks suitably secured to the frame members of the truck, and preferably by use of rivets hot-riveted. The upper guide-block M is provided with a central perforation corresponding with the diameter of the bolt L, so as to freely move longitudinally in the same. The lower guide-block M' is secured to the lower member of the frame, preferably by rivets, as the other, and is provided with a vertical perforation of diameter corresponding with the outside diameter of the sleeve $M^2$, so that the said sleeve may freely move longitudinally in the same. The lower end of this check-bolt L is provided with a check-piece $M^3$, suitably secured to the lower end portion of said bolt and having bearing against the lower end of said sleeve $M^2$ for holding it at all times on the lower portion of said bolt. This check-piece $M^3$, I preferably make in the form of a screw-threaded nut working on the screw-threaded end of the bolt and against the lower end of the said sleeve $M^2$ and held in place from turning off by means of a key (not shown) or by a check-nut. The upper guide-block M has provided in its lower side the recessed seat $n$, receiving the upper end of the check-spring N.

N is a spring seat-block provided in its upper side with recess $n'$, receiving the lower end of the check-spring N, and having in its lower side a recessed seat receiving the upper end of the sleeve $M^2$, and is also provided with a central perforation for free passage of the bolt L through said seat-block. The spring N is seated under tension between the fixed upper guide-block M and the movable spring seat-block N, mounted on the upper end of sleeve M, while the check-bolt L passes down from the bolster-plate E through the block M, spring N, movable spring seat-block N', sleeve $M^2$, working through the lower block M, when the check-piece $M^3$, secured to the lower end of the bolt L, will hold it from moving upward past a predetermined limit. These elastic guiding check-bolts L, arranged and operating with the spring N, movable seat-block N', and sleeve $M^2$, operate to hold the bolster-plates and car-body (not shown) mounted thereon from shifting either laterally or longitudinally in any direction. They also operate to limit the expansion of the load-bearing springs comprising those springs (of whatever kind employed) between the bolster-plates E and the side frames of the truck, and they operate particularly to prevent the elliptic springs K from being expanded upwardly beyond the limit of the original or normal set of the said springs, and they also thereby contribute to prevent vertical oscillations of the ends of the bolster-plates and the car-body seated on said plates, and coacting with the tension-springs below the housing B and load-supporting springs above the same they unitedly operate to cause the bolster-plates and car-body (not shown) seated thereon to have an easy and uniformly-similar reciprocating vertical movement from elastic load-bearing supports variously situated between the bolster-plates and truck-frame and between the truck-frame and the axles of the truck-wheels.

O O are elastically-supported motor-supporting bars arranged transversely to the direction of length of the truck-frame, which bars may be supported by any known elastic supporting devices; yet I at present prefer to employ the means shown in the drawings for effecting an elastic support of said bars by dual elastic supporting devices comprising the fixed double-spring seat-block P, having in its upper side seat $p$ and in its lower side seat $p'$ and secured to a member of the side frame of the truck, upper seat P' and lower seat P², spring O' between the upper seat P' and the fixed double-seat spring-block P, and spring O² between said spring-block P and the lower seat P², and vertically-moving suspension-bolt O³, passing through the upper seat P', upper spring O', fixed double-spring block P, lower spring O², and lower seat P², and thence through the end of the bar O to be supported, the opposite ends of which suspension-bolt being provided with screw-threads and having on them corresponding screw-threaded nuts $o$ $o$, which may at will be tightened toward each other for increasing the tension of the springs O' O² or run off from each other to lessen the tension of said springs.

Having described my invention, what I claim, and desire to secure by Letters Patent, is—

1. In a car-truck, the combination with two oppositely-located pedestals, each forming a part of a side frame of the truck, bolsters E E which are each elastically supported each from a side frame of the truck and in position above the upper end of the pedestal and separate and independent of both the frame and pedestal below, an axle having a journal with each of its ends, a pair of wheels rigidly secured on said axle, and housings, one in each pedestal and receiving each a journal of said axle, and situated within the jaw-opening in its pedestal, of a load-supporting spring between each pedestal and the upper side of its housing, a tension-spring support H, rigidly secured to the lower ends of the limbs of each pedestal and having a spring-receiving wall $g$ projected above a spring-seating surface located in said support below the plane of the lower ends of the pedestals, and tension-springs G, each below the lower side of a housing and between it and the spring-support below with its lower half portion supported from lateral deflection by the wall $g$ projecting from said support, substantially as and for the purposes set forth.

2. In a car-truck the combination with the side frames of the truck, bolster-plates E, over each side frame and load-bearing springs interposed between said bolster-plates and side frames, of guide-blocks M and M' secured to the side frames, elastic guiding check-bolts L, adjustably secured to said bolster-plates and working loosely in said guide-blocks, checking-pieces M³ secured to the lower end of each said check-bolt and adapted to limit the upward movement of said bolts and the said bolster-plates in relation to the side frames of the truck, substantially as and for the purposes set forth.

3. In a car-truck the combination with a bolster-plate E, a side frame, two or more springs interposed between said side frame and bolster-plate, perforated guide-blocks M having each in its lower side the seat $n$ and rigidly secured to an upper member of the side frame, guide-blocks M' rigidly secured to a lower member of the frame with the centers of their perforations on alinement with those of the bores of blocks M, and check-bolts L adjustably secured by their upper ends to the bolster-plate and passing through said guide-blocks, of vertical sleeves M² working loosely in the guide-blocks M' and receiving the lower portions of said check-bolts, spring-seats N' mounted each on the upper end of one of said sleeves and adapted to be moved as the sleeve is moved, springs N mounted each on one of said check-bolts and held supported between the seat $n$ of a guide-block M and a vertically-moving spring-seat N', and the checking-pieces M³ secured to the lower ends of said check-bolts, substantially as and for the purposes set forth.

4. The combination with the guide-block M, adapted to be secured to an upper member of a truck-frame and provided in its lower side with a recessed seat $n$ and centrally perforated, a lower guide-block M' calculated to be secured to a lower member of the truck-frame and centrally perforated, a vertical sleeve M² working loosely in the perforation in said lower guide-block, a spring-seat N' mounted on the upper end of said sleeve, of a spring N mounted between the seat $n$ and seat N', a guiding check-bolt L passing through the guide-block M, spring, lower spring-seat N' and sleeve M² and a check-piece M³ secured to the lower end of said check-bolt, the upper end of said check-bolt being adapted to be secured to a bolster elastically supported from the frame and adapted to move vertically in relation to the frame proper of the truck, all substantially as and for the purposes set forth.

5. In a car-truck, the combination with two frame members, of the truck-frame, a bolster and a spring between said frame members and the said bolster, of a spring-supporting block K' comprising the spring-seat $k'$, flanges $k$ projected laterally from said spring-seat, side webs $k^3$ and perforated sleeves $k^2$ $k^2$, between said side webs and adapted to receive rivets $c^2$ $c^2$ securing said block K' with said frame members, substantially as and for the purposes set forth.

6. In a car-truck, the combination with the end portions of two adjacent members of a side frame of the truck, of the spring-supporting block, comprising a seat, laterally-projected flanges for bearing on the upper edge of the upper one of the said frame members, side webs integral with said seat and connected by perforated sleeves integral with said side webs, and bolts or rivets holding said frame members secured to said spring-supporting block, substantially as and for the purposes set forth.

7. In a car-truck the combination with the two opposite side frames thereof, two pedestals in each side frame, a longitudinal bolster-plate over each side frame, springs between the bolsters and said side frames and allowing the former to move vertically independently of the latter, two car-wheel axles and a housing working in each pedestal of the frame and receiving each a journal end of an axle and supported on the same, a load-bearing spring between each pedestal and the upper side of the housing therein, a tension-spring support secured with the lower ends of the limbs of each pedestal in the frame, and a tension-spring between the lower side of each housing and the spring-support secured below to said pedestals, of check-bolts located at each end portion of a side frame and having their upper ends secured to the bolsters above, and held in place by guide-blocks secured to the frames, and springs mounted on said check-bolts and held between seating devices which are operated to compress the said springs when the bolsters are raised in relation to the side frames below, and also allow said springs to expand when said bolsters are depressed, substantially as and for the purposes set forth.

8. In a car-truck, the combination with the side frames of the truck in which pedestals form a part, housings working in the pedestal portions of the frames and adapted to receive the journals of the axles of the truck-wheels, load-bearing springs between said housings and side frames, and tension-springs between the lower sides of said housings and said frames, of horizontal bolster-plates arranged above said side frames and adapted to receive the body of a car, and elliptic springs interposed each between an end portion of each side frame and the bolster-plates and arranged lengthwise in relation to the latter, and calculated to support the end portions of said bolsters and prevent them moving longitudinally in relation to the said side frames, substantially as and for the purposes set forth.

9. In a car-truck, the combination with the side frames of the truck in which pedestals form a part, housings working in the pedestals and adapted to receive the journals of the car-wheel axles, load-bearing springs between said housings and side frames, tension-springs between the lower sides of said housings and frames, horizontal bolster-plates arranged above the side frames and adapted to receive the body of a car, and elliptic springs interposed each between an end portion of each side frame and the bolster-plate above and arranged lengthwise in relation to the said plates, so as to support their end portions and prevent them moving longitudinally in relation to the side frames, of elastic check-bolts arranged relatively between the pedestals of the side frames and the elliptic springs which support the end portions of the bolster-plates, the said check-bolts having their upper ends securely connected with the bolster-plates and their lower end portions working loosely in guide-blocks secured to the frame and provided with checking devices whereby the upward throw or expansion of said elliptic springs may be limited while the load-bearing springs are being expanded upwardly, or the tension-springs are being expanded downwardly, substantially as and for the purposes set forth.

HORACE L. GEE.

Witnesses:
ALEX. SELKIRK,
GEO. C. PRESTON.